United States Patent [19]

Nuechterlein

[11] Patent Number: 5,014,177
[45] Date of Patent: May 7, 1991

[54] DC-LINK RIPPLE REDUCTION CIRCUIT

[75] Inventor: Paul E. Nuechterlein, Rockford, Ill.

[73] Assignee: Sundstrand Corporation, Rockford, Ill.

[21] Appl. No.: 452,347

[22] Filed: Dec. 19, 1989

[51] Int. Cl.⁵ .............................................. H02M 1/14
[52] U.S. Cl. ........................................ 363/45; 363/46; 363/39
[58] Field of Search ............... 363/37, 39, 45, 46; 307/105; 333/181; 328/165, 167; 323/299

[56] References Cited

U.S. PATENT DOCUMENTS

| | | | |
|---|---|---|---|
| 3,746,963 | 7/1973 | VeNard, II . | |
| 3,875,539 | 4/1975 | Fendrich, Jr. | 333/181 |
| 4,001,668 | 1/1977 | Lewis | 323/299 |
| 4,209,757 | 6/1980 | Becker | 307/105 X |
| 4,241,395 | 12/1980 | Stacey et al. | 363/39 |
| 4,433,368 | 2/1984 | Choi | 363/45 |
| 4,449,177 | 5/1984 | Kozai et al. | 363/46 X |
| 4,511,836 | 4/1985 | Eriksson | 323/300 |
| 4,594,648 | 6/1986 | Gallios | 328/167 X |
| 4,641,233 | 2/1987 | Roy | 323/299 X |
| 4,651,266 | 3/1987 | Fujioka et al. . | |
| 4,685,046 | 8/1987 | Sanders | 323/299 X |
| 4,761,726 | 8/1988 | Brown . | |

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

A ripple reduction circuit includes a controllable switch, an impedance coupled to one of a pair of main current path electrodes of the controllable switch whereby the impedance and the switch are coupled between first and second DC conductors and gating circuitry coupled between one of the conductors and a control electrode of the controllable switch for closing the switch when AC ripple power is carried by the conductors whereby at least a portion of the AC ripple power is removed from the conductors and delivered to the impedance.

8 Claims, 2 Drawing Sheets

DC-LINK RIPPLE REDUCTION CIRCUIT

TECHNICAL FIELD

The present invention relates generally to circuits for reducing the magnitude of one or more AC components superimposed on a DC level, and more particularly to a circuit which reduces ripple present on DC conductors.

BACKGROUND ART

Often, it is necessary to convert AC power into DC power using a rectifier circuit comprising one or more diodes. For example, in a variable speed, constant frequency (VSCF) power generating system, variable frequency power produced by a brushless, synchronous generator driven by a variable speed prime mover is provided to a rectifier bridge which in turn produces DC power on a DC link. The DC link is in turn coupled to an inverter which converts the DC power produced on the DC link into constant frequency AC power for one or more AC loads. Typically, the rectifier bridge produces a DC voltage having an AC ripple component superimposed thereon. This ripple component, if not removed prior to conversion of the DC power into AC power by the inverter, leads to an objectionable increase in output harmonics of the inverter which must be filtered by filtering components connected between the inverter and the loads.

Previously, DC link ripple has been reduced through the use of a DC link filter connected across the conductors of the DC link. Such filters, however, are typically large and heavy, thus undesirably increasing the size and weight of the VSCF system. Examples of such types of filter are disclosed in VeNard II, U.S. Pat. No. 3,746,963, Fujioka, U.S. Pat. No. 4,651,266 and Brown, U.S. Pat. No. 4,761,726.

SUMMARY OF THE INVENTION

In accordance with the present invention, a ripple reduction circuit reduces a ripple component present on a DC level in a simple and effective manner.

More particularly, a ripple reduction circuit for reducing ripple in DC power carried by first and second conductors includes a controllable switch having main current path electrodes and a control electrode, an impedance coupled to one of the main current path electrodes whereby the controllable switch and the impedance together form a series combination which is coupled between the first and second conductors and gating circuitry coupled between one of the conductors and the control electrode. The gating circuitry closes the controllable switch when excess DC power is carried by the conductors whereby at least a portion of the excess DC power is removed from the conductors and delivered to the impedance.

In the preferred embodiment, the gating circuit includes a capacitor coupled to the first conductor and a potentiometer having a first end coupled to the capacitor, a second end coupled to the second conductor and a wiper coupled to the control electrode of the controllable switch. A zener diode is coupled between the second conductor and the control electrode of the controllable switch. A fast recovery diode is coupled between the first end of the potentiometer and the second conductor. Also in the preferred embodiment, the controllable switch comprises a power FET and the impedance comprises a resistor which dissipates the excess DC power.

The ripple reduction circuit of the present invention is substantially smaller than DC link filters. Therefore, a desirable decrease in the size and weight of the overall VSCF system is obtained.

DESCRIPTION OF THE PREFERRED EMBODIMENTS

Figure 1:
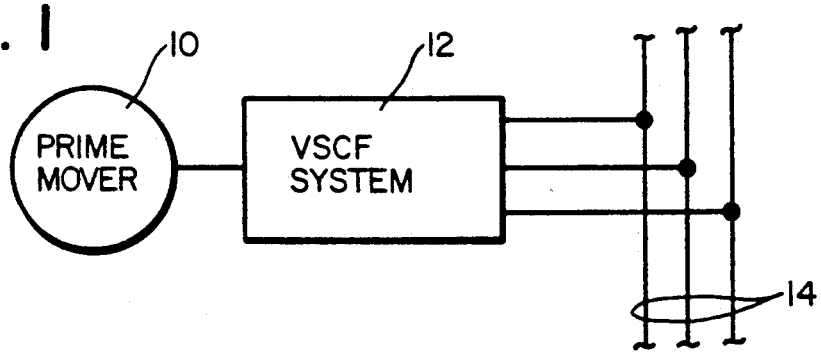
FIG. 1 comprises a block diagram of a prime mover in conjunction with a VSCF system.

Referring now to FIG. 1, a prime mover 10 develops variable speed motive power which is supplied to a variable speed, constant frequency (VSCF) system 12 which converts the variable speed motive power into constant frequency electrical power. Typically, the prime mover comprises an aircraft jet engine, although this need not be the case. The electrical power produced by the VSCF system 12 is delivered to a load bus 14 to which one or more AC loads (not shown) are connected. It should be noted that various contactors and other details associated with the load bus 14 are not shown inasmuch as they are not important to an understanding the present invention.

Figure 2:
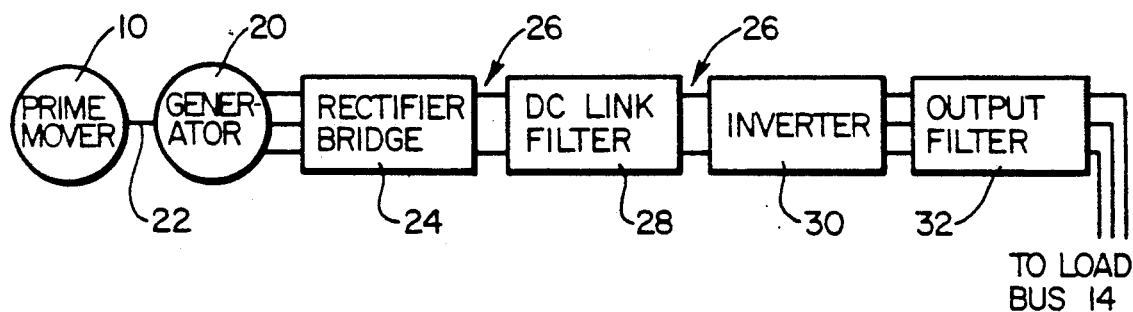
FIG. 2 is a combined simplified mechanical and electrical block diagram illustrating the VSCF system of FIG. 1 in greater detail.

FIG. 2 illustrates the VSCF system 12 in greater detail. The system includes a brushless, synchronous generator 20 having a motive power shaft 22 coupled to the prime mover 10. The generator 20 develops variable frequency electrical power which is converted by a rectifier bridge 24 into DC power on the DC link 26. As is well known, the rectifier bridge 24 typically produces an AC ripple component which is superimposed on a DC level. This ripple component is filtered by a DC link filter 28 and the filtered DC is provided to an inverter 30. The inverter is operated by an inverter control (not shown) to produce constant frequency AC power which may be filtered by an optional output filter 32 and supplied to the load bus 14.

Figure 3:
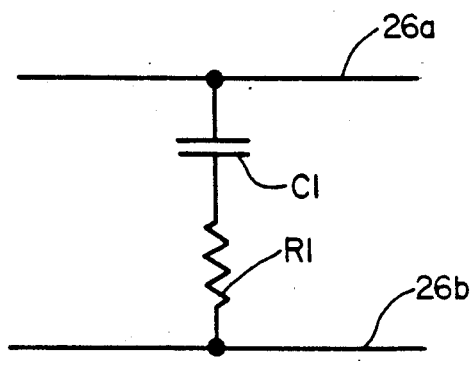
FIG. 3 is a schematic diagram of a prior art DC link filter.

FIG. 3 illustrates a prior art DC link filter of conventional design. The filter includes a capacitor C1 and a resistor R1 connected in series between first and second DC link conductors 26a and 26b. Typically, the ripple frequency varies with the output frequency of the generator 20. Inasmuch as the speed of the prime mover 10 varies within a known speed range during operating conditions, the size of the capacitor C1 and resistor R1 can be determined in advance. For aircraft applications in the three kilowatt power range, the size of the capacitor C1 is typically selected to be on the order of 20 microfarads while the resistor R1 has a resistance on the order of three ohms. The size and weight of the capacitor C1 is quite large and leads to an undesirable increase in the size and weight of the VSCF system.

Figure 4:
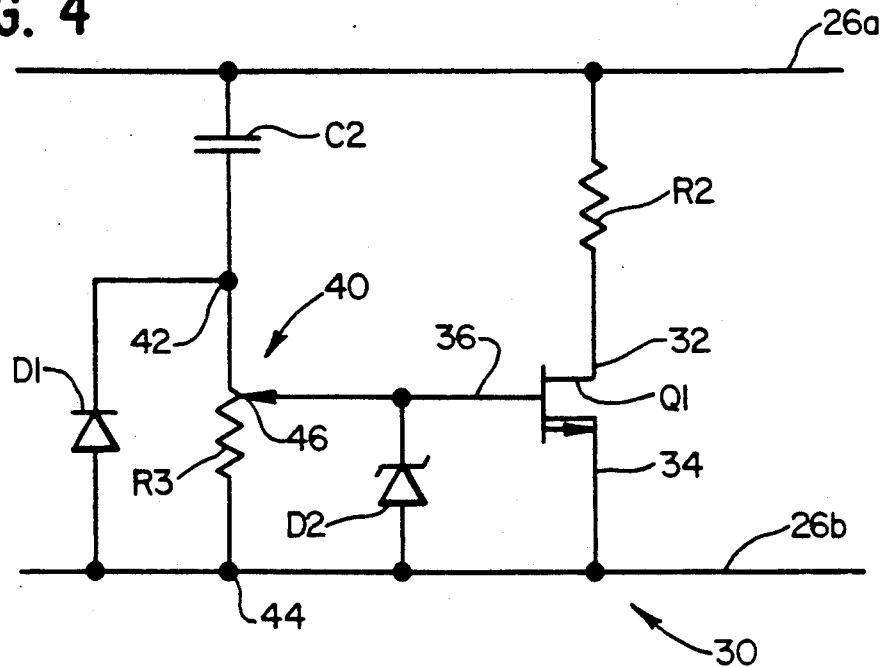
FIG. 4 is a schematic diagram of the ripple reduction circuit of the present invention.

FIG. 4 illustrates a ripple reduction circuit 30 according to the present invention. The circuit includes a controllable switch Q1 having first and second main current path electrodes 32, 34 and a control electrode 36. In the preferred embodiment, the controllable switch Q1 comprises a power transistor in the form of a power FET wherein the main current path electrodes 32, 34 comprise source and drain electrodes while the control electrode 36 comprises a gate electrode. Other types of power transistors or switches may be used, if desired. Coupled in series with one of the electrodes, for example the source electrode 32, is an impedance in the form of a resistor R2. The switch Q1 and resistor R2 thus comprise a series combination wherein the combination is coupled between the first and second conductors 26a, 26b of the DC link 26.

Coupled to the control electrode 36 of the switch Q1 is gating circuitry 40 which is also coupled to the DC link conductors 26a, 26b. The gating circuitry 40 includes a capacitor C2 coupled to the conductor 26a and a potentiometer R3 having a first end 42 coupled to the capacitor C2, a second end 44 coupled to the DC link conductor 26b and a wiper 46 coupled to the control electrode 36. A fast recovery diode D1 is coupled between the first end 42 of the potentiometer R3 and the second DC link conductor 26b. A zener diode D2 is coupled between the control electrode 36 and the second DC link conductor 26b.

In the preferred embodiment, the switch Q1 comprises a power FET having a voltage rating of 500 volts, the resistor R2 and the potentiometer R3 have resistance values of 10 kilohms, the capacitor C2 has a capacitance of one microfarad, the zener diode D2 has a reverse breakdown voltage of 12 volts and the diode D1 has a rating of one ampere.

Figure 5A:
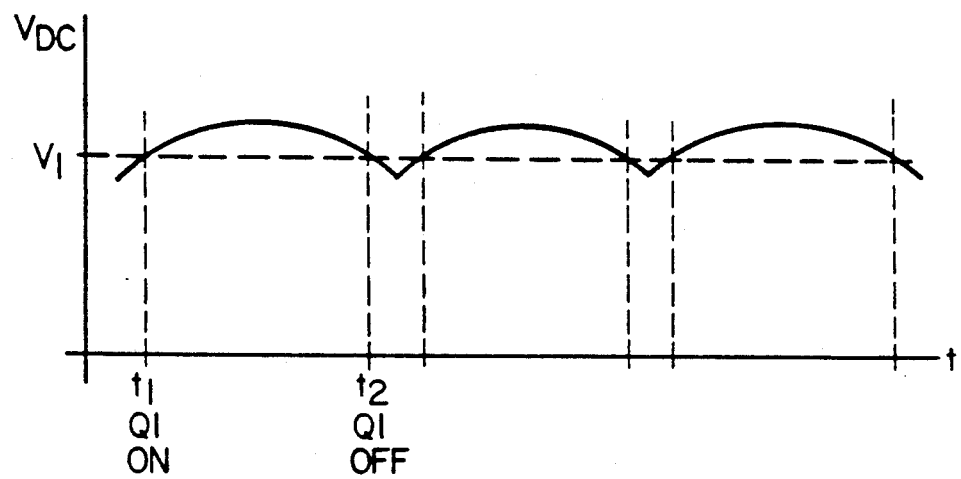
FIGS. 5a and 5b are a pair of waveform diagrams illustrating the operation of the ripple reduction circuit of FIG. 4.
Figure 5B:
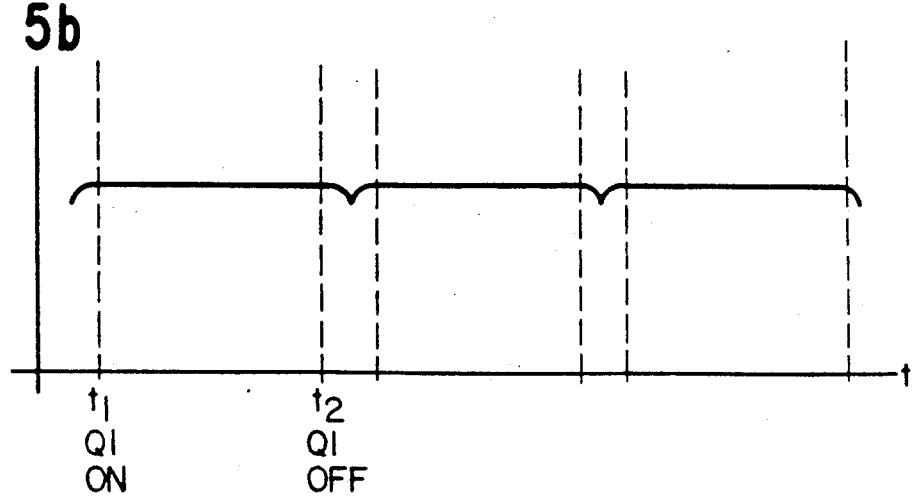

FIG. 5a is a waveform diagram illustrating the voltage on the DC link 26 without filtering. The voltage comprises an AC ripple component of approximately 50 volts peak-to-peak amplitude at six times the generator output frequency superimposed on a nominal DC level of 270 volts. When the voltage on the DC link reaches a level $V_1$ at a time $t_1$ indicating that excess AC ripple power is being carried by the conductors 26a, 26b, the transistor Q1 is turned on by the gating circuitry 40 so that the excess DC power is removed from the conductors 26a, 26b and delivered to the resistance R2. The excess power is dissipated by the resistor R2 until the DC link voltage subsequently falls below the voltage $V_1$ at a time $t_2$ at which time the transistor Q1 is turned off. The voltage on the DC link 26a, 26b thereby assumes the wave shape shown in FIG. 5b which has substantially reduced AC content as compared with the unfiltered voltage shown in FIG. 5a.

If desired, hysteresis can be introduced by the gating circuitry 40 so that the transistor Q1 turns off when a different voltage level across the DC link conductors 26a, 26b is reached.

The combined size and weight of the components of FIG. 4 are substantially reduced as compared to the size and weight of the capacitor Cl and the resistor R1 of FIG. 3. Thus, a substantial reduction in the size and weight of the overall VSCF system is obtained.

It should be noted that the present is not limited to use with VSCF systems, and in fact may be used in any application where it is desired to reduce AC content in DC power provided on DC conductors.

What is claimed is:

1. A ripple reduction circuit for reducing ripple inn DC power carried by first and second conductors, comprising:
    a controllable switch having main current path electrodes and a control electrode;
    an impedance coupled to one of the main current path electrodes such that the controllable switch and the impedance together form a series combination which is coupled between the first and second conductors; and
    gating circuitry coupled between one of the conductors and the control electrode for closing the controllable switch when AC ripple power is carried by the conductors whereby at least a portion of the AC ripple power is removed from the conductors and delivered to the impedance, wherein the gating circuitry includes a capacitor coupled to the first conductor and a potentiometer having a first end coupled to the capacitor, a second end coupled to the second conductor and a wiper coupled to the control electrode of the controllable switch.

2. The ripple reduction circuit of claim 1, wherein the controllable switch comprises a power transistor.

3. The ripple reduction circuit of claim 1, wherein the power transistor comprises a power FET.

4. The ripple reduction circuit of claim 1, wherein the gating circuitry further includes a zener diode coupled between the second conductor and the control electrode of the controllable switch.

5. The ripple reduction circuit of claim 1, wherein the gating circuitry further includes a fast recovery diode coupled between the first end of the potentiometer and the second conductor.

6. The ripple reduction circuit of claim 1, wherein the impedance comprises a resistor.

7. A ripple reduction circuit for reducing ripple in a DC voltage developed across first and second DC link conductors, comprising:
    a power FET having gate, source and drain electrodes, the drain electrode being coupled to the second DC link conductor;
    a resistor coupled between the first DC link conductor and the source electrode of the power FET;
    a capacitor coupled to the first DC link conductor;
    a potentiometer having a first end coupled to the capacitor, a second end coupled to the second DC link conductor and a wiper coupled to the gate electrode of the controllable switch;
    a zener diode coupled between the second DC link conductor and the gate electrode of the power FET; and
    a fast recovery diode coupled between the first end of the potentiometer and the second DC link conductor;
    whereby the power FET is turned on when the voltage across the DC link conductors exceeds a threshold so that the resistor dissipates power and thereby reduces such voltage.

8. The ripple reduction circuit of claim 7, wherein the capacitor has a capacitance on the order of one microfarad.

* * * * *